July 23, 1957     S. KURIANSKI     2,799,929
DEVICE FOR CUTTING RAVIOLI AND THE LIKE
Filed April 27, 1956
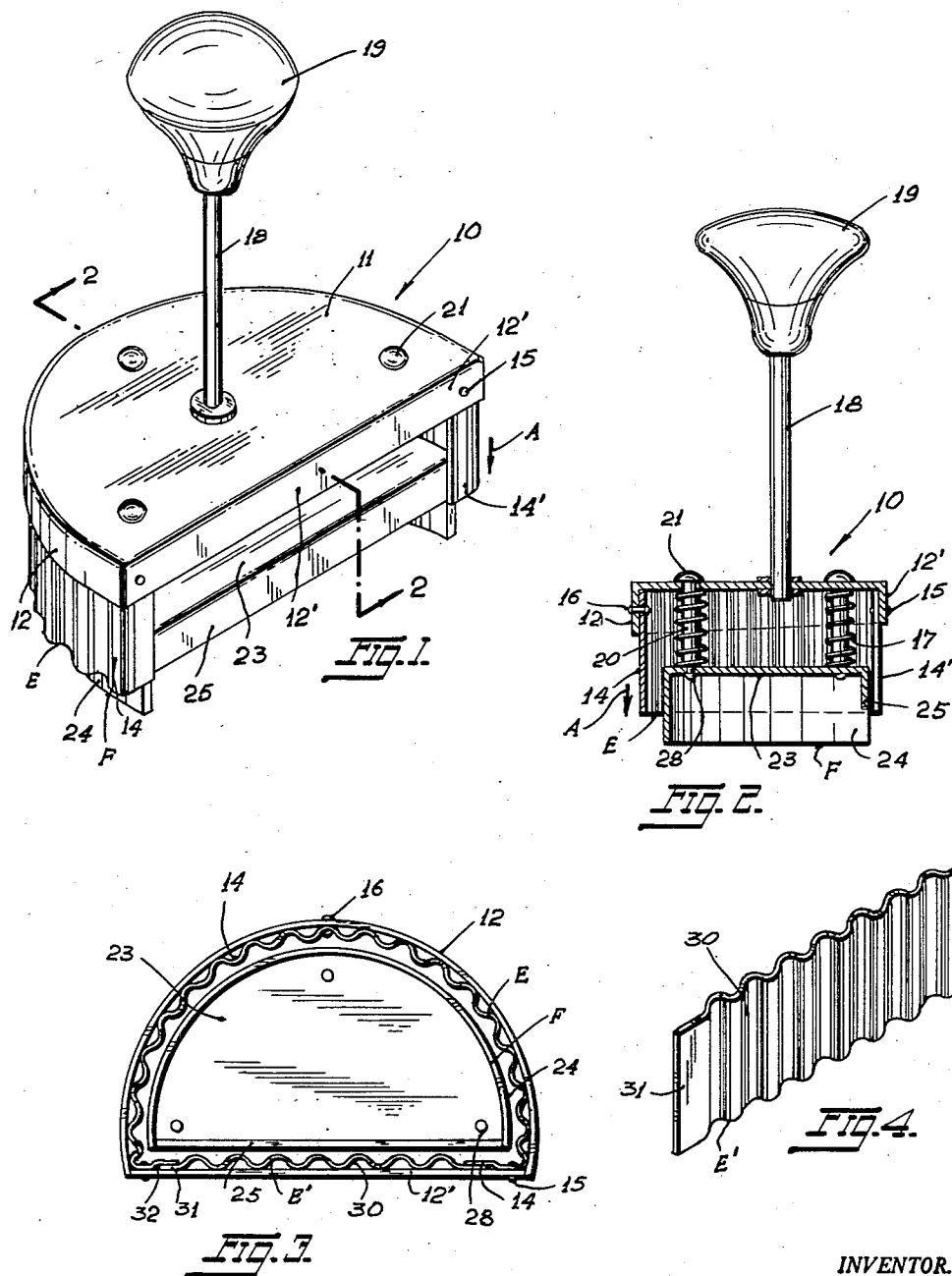
INVENTOR.
STANISLAU KURIANSKI
BY
ATTORNEY

2,799,929
DEVICE FOR CUTTING RAVIOLI AND THE LIKE

Stanislau Kurianski, Whitestone, N. Y.

Application April 27, 1956, Serial No. 581,222

1 Claim. (Cl. 30—301)

This invention relates to the art of dough cutters and particularly concerns a device for cutting scalloped edge pieces of dough for making ravioli, cookies, and the like.

The invention in its preferred form is a one hand operating device. The device includes a stationary pressure or pedestal plate for holding the dough to be cut flat and stationary, and a spring biased semicircular corrugated cutter operated by a handle to cut out the desired scalloped form. A removable corrugated cutter plate may be used with the semicircular cutter.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a dough cutting device embodying the invention.

Fig. 2 is a sectional view taken on lines 2—2 of Fig. 1.

Fig. 3 is a bottom plan view of a modification of the invention.

Fig. 4 is a perspective view of a corrugated cutter used in the embodiment of Fig. 3.

In Figs. 1 and 2 is shown the device 10 in its preferred form. The device has an upper flat plate 11 which is semicircular in form and has a depending skirt. The skirt extends around the entire periphery of the plate. The skirt has a curved portion 12 and a straight portion 12'. A corrugated cutter plate 14 bent in a semicircular arc is attached to the skirt by rivets 15 and 16. The plate 14 extends up to the straight portion 12' of the skirt where inwardly turned sections 14' of the plate 14 are secured near their upper ends by the rivets 15 to the straight portion 12' of the skirt. A centrally disposed rivet 16 joins the corrugated plate to the curved portion 12 of the skirt at the center thereof near plate 11, as best shown in Fig. 2. The free edge E of the cutter plate 14 is sufficiently sharp to cut any soft dough.

An elongated post 18 is mounted on plate 11 axially with the center of gravity of the device 10. A smooth knob or handle 19 is attached to post 18. At least three posts 20 are provided with enlarged heads 21. The posts extend through apertures in plate 11 and the heads normally bear on the outer or upper surface of plate 11. The posts 20 are disposed in spaced positions substantially ninety degrees apart. The lower ends of the posts are secured by beads 28 to a flat semicircular plate 23 having a smaller radius than plate 11. Plate 23 has an integral skirt depending therefrom. The skirt includes a semicircular portion 24 and a flat portion 25. Skirt portion 25 is narrower than skirt portion 24, but if desired both skirt portions may be made of equal width.

A coil spring 17 is disposed on each post between plates 11 and 23 and serves to bias the plate 11 upwardly so that the cutting edge E of plate 14 is elevated. The bottom edge F of skirt portion 24 is semicircular and blunt or is flat so that it will not cut the dough when the device is placed upon the dough.

In operation, the device is placed on a flat sheet of dough rolled to desired thickness. The flat bottom edge F holds the dough firmly for cutting. When the handle is pressed downwardly plate 14 moves downwardly as indicated by arrow A to make a scalloped cut in the dough. While the handle is pressed down, posts 20 extend further through plate 11 as heads 21 are lifted off plate 11, and springs 17 are further compressed. When the handle is released the springs expand to restore the plate 11 to its normal spacing from plate 23 and the cutting edge E of the cutter plate assumes its normal position elevated above or spaced from the flat bottom F of skirt portion 24.

In use, the device shown in Figs. 1 and 2 should be so placed that skirt portion 25 extends beyond the margin or free edge of the dough to be cut so that a scalloped piece of dough with a straight edge and semicircular side will be cut free from the sheet of dough.

If it is desired to use the device to cut a wholly scalloped piece anywhere on the sheet of dough, the modification of the invention as shown in Figs. 3 and 4 may be used.

In Figs. 3 and 4 is shown a flat corrugated plate 30 which has uncorrugated flat edges or marginal sections 31 and a lower cutting edge E'. This plate may be inserted in the device as a continuation of the semicircular cutter plate 14 to provide a straight scalloped edge to a cut piece of dough. The inwardly turned edges 14' of the cutter plate are turned inwardly to form grooves 32 with skirt portion 12'. The margins 31 of plate 30 fit tightly into these grooves so that the cutting edge E' is coplanar with cutting edge E of cutter plate 14. Plate 30 is removable so that the device can be used without the supplementary straight cutter.

The entire device is preferably made of a light non-corroding material such as aluminum. Knob 19 may be made of wood or some plastic material. If desired, plates 14 and 30 may be made of stainless steel.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A dough cutter device comprising a first flat semicircular apertured plate having a peripheral depending skirt, a semicircular corrugated cutter plate secured near one end thereof to said skirt, an elongated handle secured to said first plate and having its axis substantially on a line with the center of gravity of the device, a second flat semicircular plate having a peripheral skirt depending therefrom, said latter skirt having a flat semicircular bottom edge, at least three posts secured in spaced positions approximately ninety degrees apart to the second plate and extending through apertures in the first plate, a coil spring disposed on each of said posts between the flat plates and biasing the flat plates apart, said posts having enlarged heads bearing on the upper surface of the first plate, said first flat plate having a larger radius than the second plate, said corrugated plate having a sharp bottom cutting edge and being disposed to enclose partially said last-named skirt, with the cutting edge of the corrugated plate normally spaced from and elevated above the flat bottom of the last-named skirt, said semicircular corrugated cutter plate being fastened adjacent its ends to the inner surface of the straight portion of the firstnamed depending skirt, the extremities of said ends being spaced away from said inner surface providing grooves, and a flat corrugated plate depending from the first flat semicircular plate at its straight portion, the marginal edges of said flat corrugated plate being frictionally engaged in said grooves for holding said flat corrugated plate in place.

References Cited in the file of this patent

UNITED STATES PATENTS

| | | |
|---|---|---|
| 176,217 | Collins | Apr. 18, 1876 |
| 625,636 | Bass et al. | May 23, 1899 |
| 1,692,436 | Deane | Nov. 20, 1928 |

FOREIGN PATENTS

| | | |
|---|---|---|
| 158,722 | Great Britain | Feb. 15, 1921 |